United States Patent
Wang

(10) Patent No.: US 9,030,158 B2
(45) Date of Patent: May 12, 2015

(54) CHARGER DEVICE

(71) Applicant: Tzyy-Gang Wang, New Taipei (TW)

(72) Inventor: Tzyy-Gang Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 309 days.

(21) Appl. No.: 13/655,489

(22) Filed: Oct. 19, 2012

(65) Prior Publication Data

US 2013/0099728 A1  Apr. 25, 2013

(30) Foreign Application Priority Data

Oct. 25, 2011 (TW) .............................. 100220032 U

(51) Int. Cl.
*H02J 7/00* (2006.01)
*H02J 7/04* (2006.01)

(52) U.S. Cl.
CPC .............. *H02J 7/0031* (2013.01); *H02J 7/044* (2013.01)

(58) Field of Classification Search
CPC ..... H02J 7/0031; H02J 7/0052; H02J 7/0055; H02J 2007/0059; H02J 7/02; H02J 7/022
USPC ................. 320/107, 110, 111, 137
See application file for complete search history.

(56) References Cited

U.S. PATENT DOCUMENTS

| | | | | |
|---|---|---|---|---|
| 5,995,393 A * | 11/1999 | Deierlein | ......................... | 363/49 |
| 8,185,212 B2 * | 5/2012 | Carbunaru et al. | ............. | 607/61 |
| 8,446,042 B2 * | 5/2013 | Bundschuh et al. | ............ | 307/80 |
| 8,602,288 B2 * | 12/2013 | Shelton et al. | ............. | 227/176.1 |

FOREIGN PATENT DOCUMENTS

| | | |
|---|---|---|
| CN | 101369736 | 2/2009 |
| CN | 201315498 | 9/2009 |

* cited by examiner

*Primary Examiner* — M'Baye Diao
(74) *Attorney, Agent, or Firm* — Novak Druce Connolly Bove + Quigg LLP

(57) ABSTRACT

A charger device includes a switch, a rectification circuit, a DC/DC converter, and an automatic disconnecting circuit. The automatic disconnecting circuit is connected to the switch, the battery, the rectification circuit, and the DC/DC converter. The automatic disconnecting circuit automatically disconnects the charger device from the alternating current power source when the battery is fully charged. The automatic disconnecting circuit includes an inductor, a first resistor, a capacitor, a second resistor, a third resistor, a comparator, a switch element and a relay. The relay comprises a coil and a normally-open switch. The normally-open switch turns on or off according to the switch element to control a connection between the charger device and the alternating current power source.

10 Claims, 2 Drawing Sheets

CHARGER DEVICE

BACKGROUND

1. Technical Field

The disclosure relates to electronic devices, and particularly to a charger device.

2. Description of Related Art

Portable wireless electronic devices are very popular and must be recharged using charger devices. However, the charger devices continue to feed power into the portable electronic devices after the portable electronic devices are fully charged, which results in power loss and shortened life of batteries of the wireless electronic devices.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
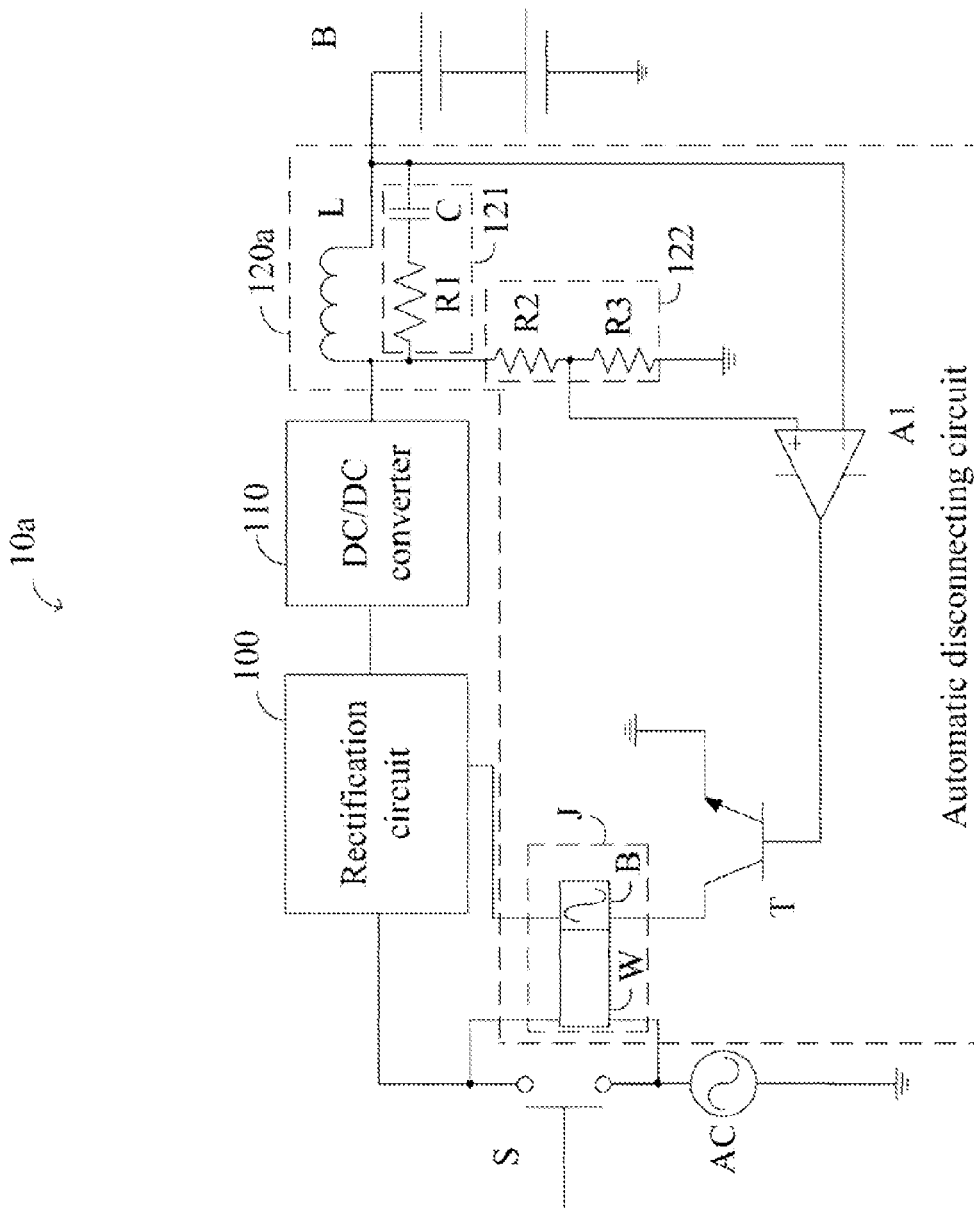
FIG. 1 is a circuit diagram of one embodiment of an automatic disconnecting circuit of a charger device as disclosed.

FIG. 1 is a circuit diagram of one embodiment of an automatic disconnecting circuit 120a of a charging device 10a as disclosed. In one embodiment, the charging device 10a comprises a switch S, a rectification circuit 100, a DC/DC converter 110, and the automatic disconnecting circuit 120a. The charging device 10a converts alternating current power supplied by the alternating current power source AC into suitable direct current power, to charge a battery B. The switch S is connected between the alternating current power source AC and the rectification circuit 100. The rectification circuit 100 rectifies the alternating current power supplied by the alternating current power source AC into first direct current power.

The DC/DC converter 110 is connected to an output of the rectification circuit 100, and converts the first direct current power into the suitable direct current power to charge the battery B. The automatic disconnecting circuit 120a is connected to the alternating current power source AC, the rectification circuit 100, and the battery B, to automatically disconnect the rectification circuit 100 from the alternating current power source AC when the battery B is fully charged.

In one embodiment, the switch S is a push button switch. When the switch S is pushed, the alternating current power source AC is directly connected to the rectification circuit 100, and the charger device 10a is triggered to work. When the switch S is released, the alternating current power source AC is indirectly connected to the rectification circuit 100 through the automatic disconnecting circuit 120a. The automatic disconnecting circuit 120a automatically disconnects the rectification circuit 100 from the alternating current power source AC to save power after detecting that the battery B is fully charged.

In one embodiment, the disconnecting circuit 120a comprises an inductor L, a first resistor R1, a capacitor C, a second resistor R2, a third resistor R3, a comparator A1, a switch element T, and a relay J. The inductor L is connected between an output of the DC/DC converter 110 and a positive terminal of the battery B. The first resistor R1 is connected in series to the capacitor C to compose a RC circuit 121. The RC circuit 121 is connected between the output of the DC/DC converter 110 and the positive terminal of the battery in parallel with the inductor L.

The second resistor R2 is connected to the third resistor R3 in series to compose a dividing circuit 122. The dividing circuit 122 is connected between the output of the DC/DC converter 110 and ground. A non-inverting input of the comparator A1 is connected to a common node of the second resistor R2 and the third resistor R3. An inverting input of the comparator A1 is connected to the positive terminal of the battery B.

In one embodiment, the switch element T comprises a first pole grounded, a control pole connected to an output of the comparator A1, and a second pole. The relay J comprises a normally-open switch W connected between the alternating current power source AC and the rectification circuit 100 in parallel with the switch S, and a coil B connected between the second pole of the switch element T and the rectification circuit 100. The normally-open switch W turns on or off according to the switch element T to control a connection between the charger device 10a and the alternating current power source AC.

In one embodiment, the switch element T is an npn-type transistor. The first pole of the switch element T is an emitter of the npn-type transistor, the control pole of the switch element T is a base of the npn-type transistor, and the second pole of the switch element T is a collector of the npn-type transistor.

In one embodiment, the rectification circuit 100 is connected to the alternating current power source AC through the switch S, and rectifies the alternating current power supplied by the alternating current power source AC into the first direct current power when the switch S is pushed. Correspondingly, the DC/DC converter 110 converts the first direct current power into the suitable direct current power to charge the battery B through the inductor L. At this time, a voltage of the non-inverting input of the comparator A1 is higher than a voltage of the inverting input of the comparator A1, so the comparator A1 outputs a high level voltage signal such as 4V. Thus, the switch element T turns on, and there is a current flowing through the coil B of the relay J, which controls the normally-open switch W of the relay J to close. Therefore, the rectification circuit 100 is connected to the alternating current power source AC through the normally-open switch W of the relay J, and the charger device 10a works normally when the switch S is released.

When the battery B is fully charged, the voltage of the non-inverting input of the comparator A1 is lower than the voltage of the inverting input of the comparator A1, thus the comparator A1 outputs a low level voltage signal, such as 0.2V. Thus, the switch element T turns off, and the coil B of the normally-open switch W of the relay J is released and the switch S also turns off. Therefore, the rectification circuit 100 is disconnected from the alternating current power source AC, and the charger device 10a stops working, which significantly saves power.

Figure 2:
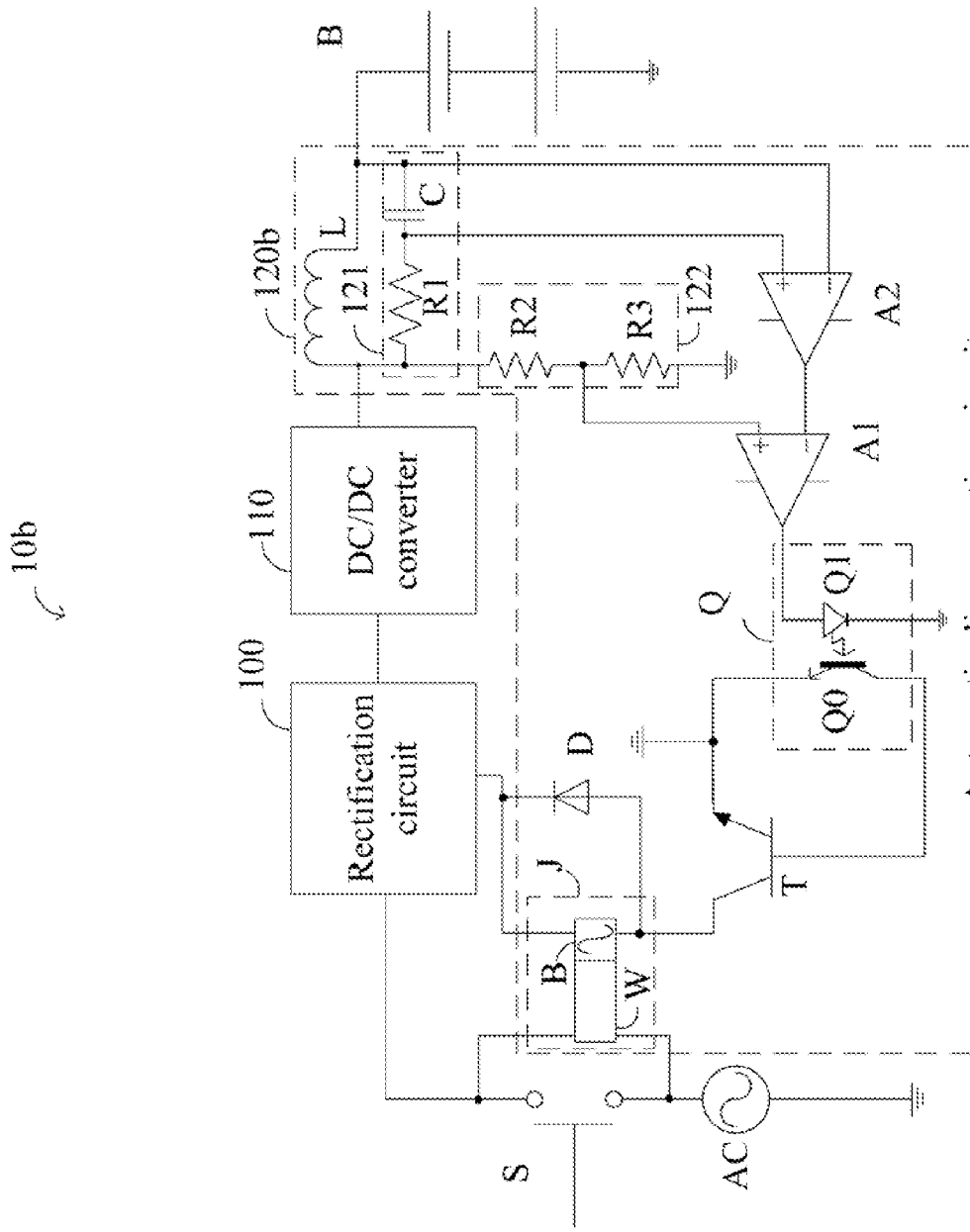
FIG. 2 is a circuit diagram of another embodiment of an automatic disconnecting circuit of a charger device as disclosed.

FIG. 2 is a circuit diagram of another embodiment of an automatic disconnecting circuit 120b of the charger device 10b as disclosed. In one embodiment, the automatic disconnecting circuit 102b is similar to the automatic disconnecting circuit 102a in FIG. 1. Difference between the automatic disconnecting circuit 102b and the automatic disconnecting circuit 102a is that the automatic disconnecting circuit 120b further comprises one or more elements selected from an amplifier A2, a photo coupler Q and a diode D. A non-inverting input of the amplifier A2 is connected between the first resistor R1 and the capacitor C. An inverting input of the amplifier A2 is connected to the positive terminal of the battery B. An output of the amplifier A2 is connected to the inverting input of the comparator A1. The photo coupler Q comprises a light emitting diode Q1 and a transistor Q0. An anode of the light emitting diode Q1 is connected to the output of the comparator A1, and a cathode of the light emitting diode Q1 is grounded. An emitter of the transistor Q0 is grounded, and a collector of the transistor Q0 is connected to the control pole of the switch element T. An anode of the diode D is connected to the second pole of the switch element T, and a cathode of the diode D is connected to a common node of the coil B of the relay J and the rectification circuit 100.

The charger devices 10a and 10b control the switch element T to turn on or off, and control the normally-open switch W of the relay J to turn on or off according to the state of charge of the battery B, so as to disconnect the battery B from the alternating current power source AC to save power when the battery B is fully charged.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A charger device converting alternating current power supplied by an alternating current power source into suitable direct current power to charge a battery, the charger device comprising:
   a switch having a first end connected to the alternating current power source;
   a rectification circuit connected to a second end of the switch, the rectification circuit rectifying the alternating current power to first direct current power, the rectification circuit comprising an output;
   a DC/DC converter connected to the output of the rectification circuit, the DC/DC converter converting the first direct current power into the suitable direct current power, the DC/DC converter comprising an output; and
   an automatic disconnecting circuit connected to the switch, the battery, the rectification circuit and the DC/DC converter; the automatic disconnecting circuit automatically disconnecting the rectification circuit from the alternating current power source when the battery is fully charged, the automatic disconnecting circuit comprising;
       an inductor connected between the output of the DC/DC converter and a positive terminal of the battery;
       a first resistor having a first end connected to the inductor;
       a capacitor connected to a second end of the first resistor and the positive terminal of the battery;
       a second resistor having a first end connected to the output of the DC/DC converter;
       a third resistor connected between a second end of the second resistor and ground;
       a comparator comprising a non-inverting input connected to the second end of the second resistor and an inverting input connected to the output of the DC/DC converter;
       a switch element, comprising a first pole grounded, a control pole connected to an output of the comparator, and a second pole; and
       a relay comprising a coil connected between the second pole of the switch element and the rectification circuit, and a normally-open switch connected between the alternating current power source and the rectification circuit, wherein the normally-open switch turns on or off according to the switch element to control a connection between rectification circuit and the alternating current power source.

2. The charger device of claim 1, wherein the automatic disconnecting circuit further comprises:
   an amplifier comprising a non-inverting input connected to the second end of the first resistor, an inverting input connected to the positive terminal of the battery, and an output connected to the inverting input of the comparator.

3. The charger device of claim 1, wherein the automatic disconnecting circuit further comprises:
   a photo coupler comprising a light emitting diode and a transistor, an anode of the light emitting diode connected to the output of the comparator, and a cathode of the light emitting diode grounded; the transistor comprising an emitter grounded, a collector connected to the control pole of the switch element, and a base.

4. The charger device of claim 1, wherein the automatic disconnecting circuit further comprises:
   a diode comprising an anode connected to the second pole of the switch element, and a cathode connected to a common node of the coil of the relay and the rectification circuit.

5. The charger device of claim 1, wherein the switch element is an npn-type transistor, the first pole of the switch element is an emitter of the npn-type transistor, the control pole of the switch element is a base of the npn-type transistor, and the second pole of the switch element is a collector of the npn-type transistor.

6. A charger device, comprising a switch, a rectification circuit, a DC/DC converter and an automatic disconnecting circuit, the automatic disconnecting circuit connected to the switch, the battery, the rectification circuit and the DC/DC converter; the automatic disconnecting circuit automatically disconnecting the rectification circuit from the alternating current power source when the battery is fully charged, the automatic disconnecting circuit comprising;
   an inductor connected between an output of the DC/DC converter and a positive terminal of the battery;
   a first resistor having a first end connected to the inductor;
   a capacitor connected to a second end of the first resistor and the positive terminal of the battery;
   a second resistor having a first end connected to the output of the DC/DC converter;
   a third resistor connected between a second end of the second resistor and ground;
   a comparator with a non-inverting input connected to the second end of the second resistor and an inverting input connected to the output of the DC/DC converter;

a switch element comprising a first pole grounded, a control pole connected to an output of the comparator, and a second pole; and a relay comprising a coil connected between the second pole of the switch element and the rectification circuit, and a normally-open switch connected between the alternating current power source and the rectification circuit, wherein the normally-open switch turns on or off according to the switch element to control a connection between the rectification circuit and the alternating current power source.

7. The charger device of claim 6, wherein the automatic disconnecting circuit further comprises an amplifier, wherein the amplifier comprises a non-inverting input connected to the second end of the first resistor, an inverting input connected to the positive terminal of the battery, and an output connected to the inverting input of the comparator.

8. The charger device of claim 6, wherein the automatic disconnecting circuit further comprises a photo coupler, wherein the photo coupler comprises a light emitting diode and a transistor, an anode of the light emitting diode connected to the output of the comparator, and a cathode of the light emitting diode grounded; the transistor comprises an emitter grounded, a collector connected to the control pole of the switch element, and a base.

9. The charger device of claim 6, wherein the automatic disconnecting circuit further comprises a diode, wherein the diode comprises an anode connected to the second pole of the switch element, and a cathode connected to a common node of the coil of the relay and the rectification circuit.

10. A charger device, comprising a rectification circuit and a DC/DC converter, to convert alternating current power supplied by an alternating current power source into suitable direct current power to charge a battery, the charger device comprising:

a switch having a first end connected to the alternating current power source; and an automatic disconnecting circuit, connected to the switch, the battery, the rectification circuit and the DC/DC converter, the automatic disconnecting circuit automatically disconnecting the charger device from the alternating current power source when the battery is fully charged, the automatic disconnecting circuit comprising;

an inductor connected between an output of the DC/DC converter and a positive terminal of the battery;

a RC circuit, connected to the inductor in parallel;

a dividing circuit, connected to the output of the DC/DC converter and ground to generate a dividing signal;

a comparator comprising a non-inverting input connected to the dividing circuit to receiving the dividing signal and an inverting input connected to the output of the DC/DC converter;

a switch element comprising a first pole grounded, a control pole connected to an output of the comparator, and a second pole; and a relay comprising a coil connected between the second pole of the switch element and the rectification circuit, and a normally-open switch connected between the alternating current power source and the rectification circuit;

wherein the voltage of the non-inverting input of the comparator is higher than the voltage of the inverting input of the comparator, so the comparator outputs a high level voltage signal, the switch element turns on, there is current flowing through the coil of the relay, which controls the normally-open switch of the relay to close and turn on, and the alternating current power source supplies alternating current power to the rectification circuit;

wherein when the battery is fully charged, the voltage of the non-inverting input of the comparator is lower than the voltage of the inverting input of the comparator, the comparator outputs a low level voltage signal, the switch element turns off, and the alternating current power source stops supplying alternating current power to the rectification circuit.

* * * * *